United States Patent
Dean

[11] 3,976,321
[45] Aug. 24, 1976

[54] SHEET MATERIAL HANDLING APPARATUS

[75] Inventor: George A. Dean, Kansas City, Mo.

[73] Assignee: Dean Research Corporation, Kansas City, Mo.

[22] Filed: Feb. 21, 1975

[21] Appl. No.: 551,910

[52] U.S. Cl.............................. 294/81 R; 294/67 BC
[51] Int. Cl.². ............................................. B66C 1/48
[58] Field of Search.............. 294/63 R, 67 R, 67 A, 294/67 AA, 67 AB, 67 B, 67 BB, 67 BC, 67 DA, 81 R, 86 R, 106, 87 R; 214/1 S, 1 SW, 654

[56] References Cited
UNITED STATES PATENTS

| | | | |
|---|---|---|---|
| 1,525,146 | 2/1925 | Owen | 294/67 AB |
| 1,730,128 | 10/1929 | Drake | 294/67 BC |
| 1,765,023 | 6/1930 | McWane | 294/67 BC |
| 2,040,574 | 5/1936 | Sutcliffe | 294/63 R |
| 3,653,707 | 4/1972 | Pile et al. | 294/67 R X |
| 3,749,437 | 7/1973 | Lynn | 294/81 R X |
| 3,838,779 | 10/1974 | Dawson | 214/1 S X |

Primary Examiner—Johnny D. Cherry
Attorney, Agent, or Firm—Bierman & Bierman

[57] ABSTRACT

A sheet material handling apparatus is provided having a head unit from which a plurality of rods depend. The rods are in turn provided with means for engaging one end of a stack of sheet material along with means for engaging the other end of the sheet material so that the sheet material can be lifted and moved from one place to another.

16 Claims, 8 Drawing Figures

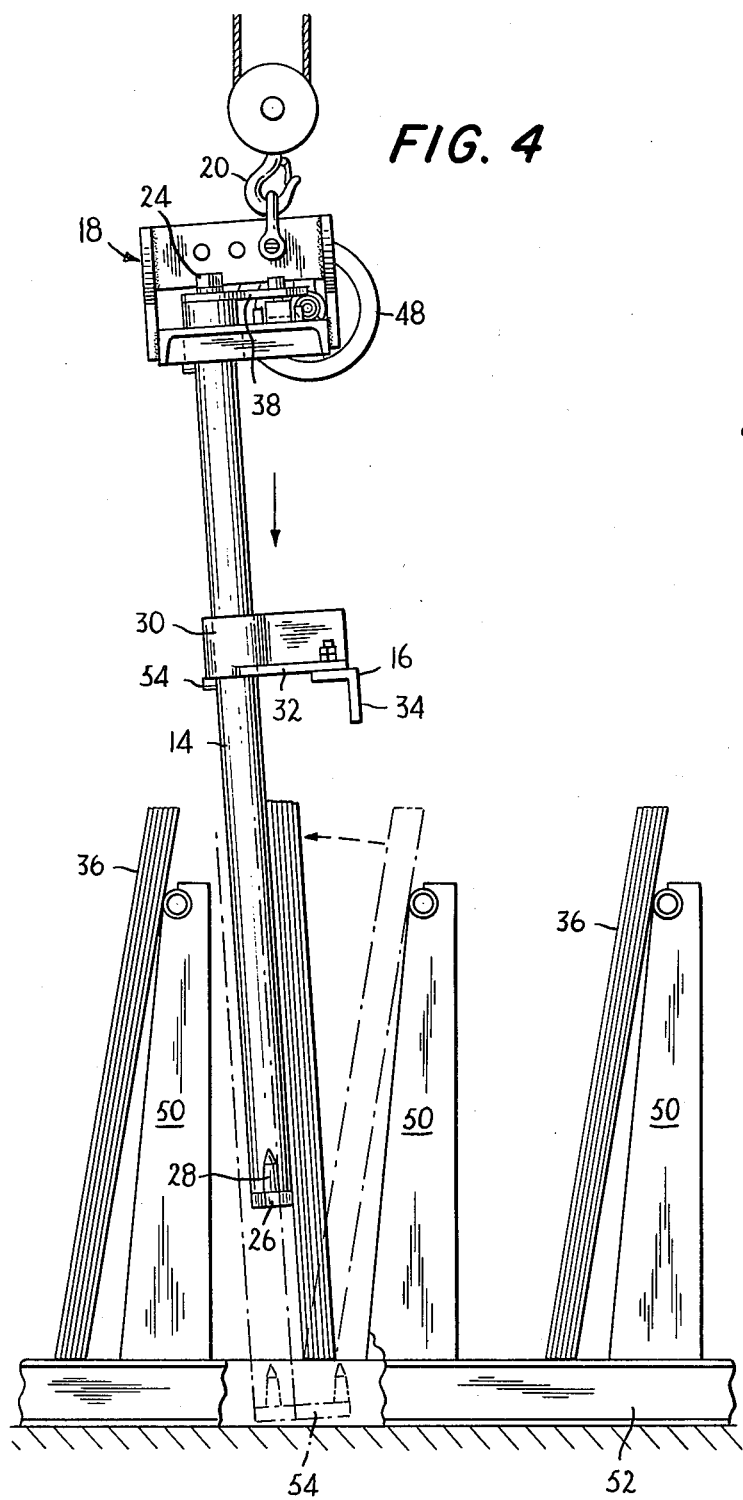
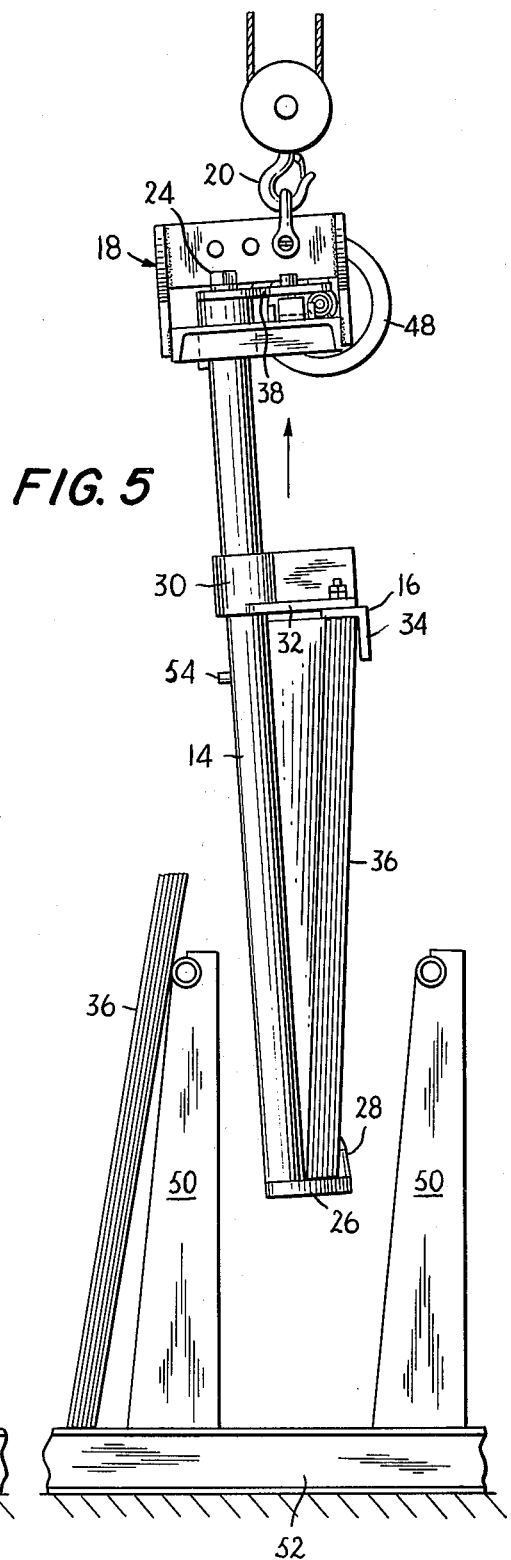

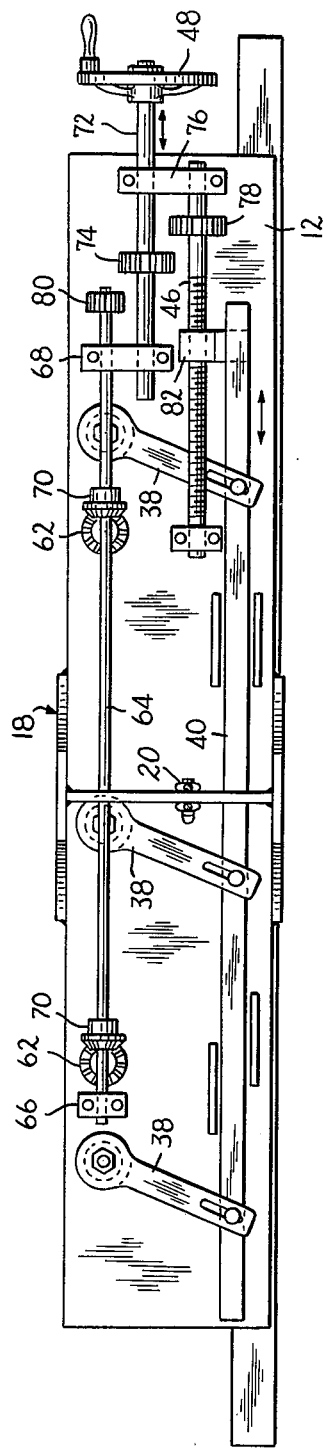
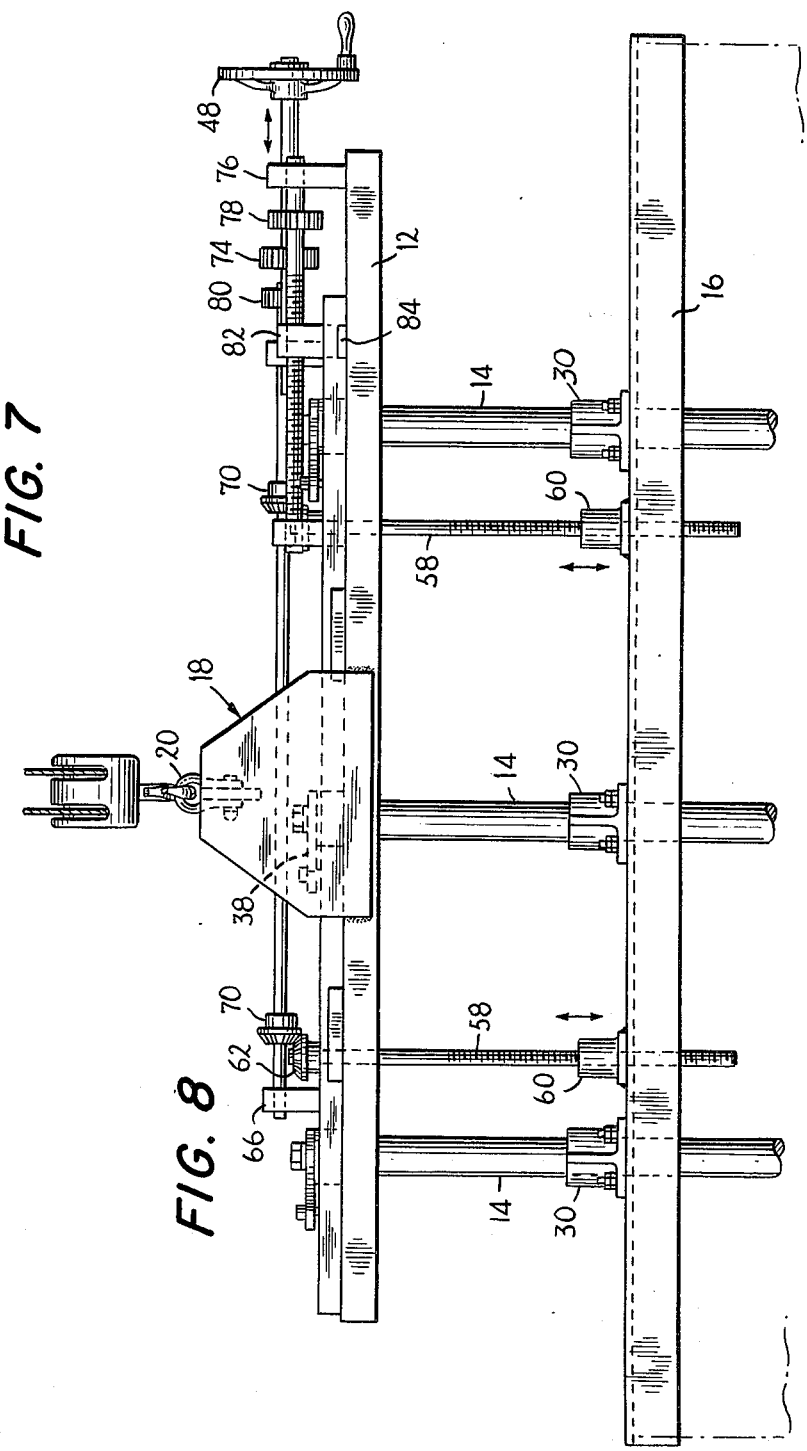

SHEET MATERIAL HANDLING APPARATUS

This invention relates to apparatus for handling sheet material and more particularly to apparatus for automatically moving sheet material, in particular metal sheets, either singly or in stacks, from one location to another, or from horizontal to vertical position or vice versa.

In accordance with the present invention, a lifting unit is provided which is preferably adapted for connection to an overhead crane of the type generally found in plants which must more heavy equipment about. The lifting unit is quite versatile and can be used to upend a stack of sheets initially lying in a horizontal position. The lifter can also be used, among other things, to move the sheet material from one location to another and deposit it in a rather confined area. The versatility of the lifting unit tends to eliminate manual handling and also tends to reduce the number of operations usually performed by one or more machines, generally in conjunction with skilled personnel, needed to shift the stacks of sheet material.

The lifter basically comprises three units: a header unit, one or more rods depending from the unit, and a moveable angle bar or other type of physical structure which can be used to engage one or more sheets. The rod is rotatable and is provided with a U-shaped end adapted to receive and preferably clamp one or more sheets therein. By rotating the rods, the opening available for the receipt of the sheet material can be varied to assure that the sheets are securely held or clamped. The angle bar has a depending leg and serves as a rest or clamp for the sheets at the end remote from the U-shaped section of the rod, the rods and angle bar providing support for the sheet material along two opposing ends thereof.

In accordance with one aspect of this invention, the rotatability of the rods allows one to reduce the effective thickness of the apparatus to permit its insertion in narrow areas. This is achieved by rotating the rods until the U-shaped section is substantially parallel to the plane of the header unit, at which point the effective thickness of the apparatus is the thickness of rods. Once the U-shaped section of the rods has cleared, for instance, the bottom of a vertical stack of sheets, the rods may be rotated to expand the effective thickness of the rods and to permit the U-shaped section to engage the stack of sheets. The angle bar may then be moved into position to engage the upper end of the stack. The overhead crane can then be activated to pick up and move the secured stack to any other position or location desired.

For best results, a plurality of rods are used to provide additional support for the stack. If desired, means may be provided for simply and easily rotating the rods. In addition, means may also be provided for mechanically raising or lowering the angle bar, although it has been found that this may be rather conveniently accomplished by the personnel normally employed to move the stacks of sheets.

Referring now to the drawings in which like numerals refer to like parts:

FIG. 4 is a side plan view of the lifter about to be used to lift a stack of sheets from the vertical position, the sheets being contained in a narrow vertical stacking device;

FIG. 5 is a side view of the lifter after it has removed the sheet material from the stacking device of FIG. 4;

FIG. 7 is a top view of another embodiment of the lifter showing mechanical means for raising and lowering the angle bar; and FIG. 8 is a front plan view of the embodiment of FIG. 7.

Figure 1:
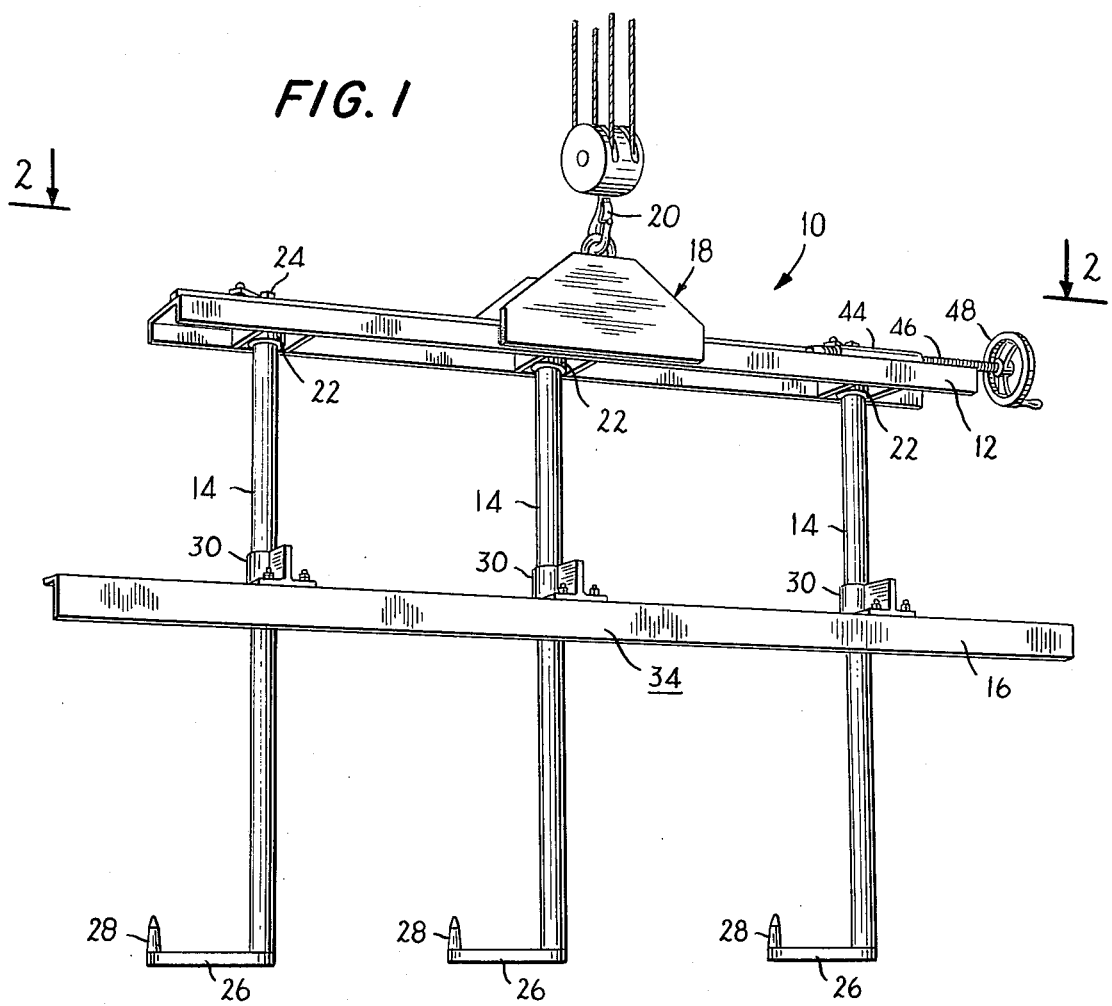
FIG. 1 is an isometric view of the lifter showing it connected to the lifting section of an overhead conveyor.

Referring to FIGS. 1–6, numeral 10 denotes the lifter which is comprised of a heater unit 12, a plurality of depending rods 14, and an angle bar 16. The header unit 12 is advantageously provided with an attachment unit 18 for receiving the hook of an overhead crane, here denoted by the numeral 20.

The rods 14 are rotatably mounted to header unit 12 via bearings 22 and nuts 24. The lower end of each rod 14 is provided with a plate 26 which is eccentrically mounted to the rods for rotation therewith, and a pin 28. The pin 28 is offset from the axis of the rod and, with the plate and lower portion of the rod, forms a U-shaped section. For best results, the pin is tapered, as shown in the drawings, in the direction towards the header unit to make it easier to engage sheet material stacks without damaging the sheets.

Angle bar 16 is provided with a plurality of bearings or collars 30 which are mounted on the upper leg 32 of the angle bar. The bearings 30 extend outwardly from the angle bar, as best seen in FIGS. 4 and 5, to allow the rods to pass alongside the angle bar without interference. Depending leg 34 of the angle bar 16 is adapted to engage one end of a stack of sheet material, as most clearly seen in FIGS. 3–6.

Depending legs 34 is positioned on the same side of the rods 14 as are the pins 28. This arrangement provides excellent support for the stack of sheets, denoted in the drawings by the numeral 36, along both sides thereof. As is most clearly seen, for instance in FIG. 6, the rods 14 will act to support one side of the stack 36 while the depending leg 34 of the angle bar and the pins 28 will both act in concert to support the other side.

Figure 2:
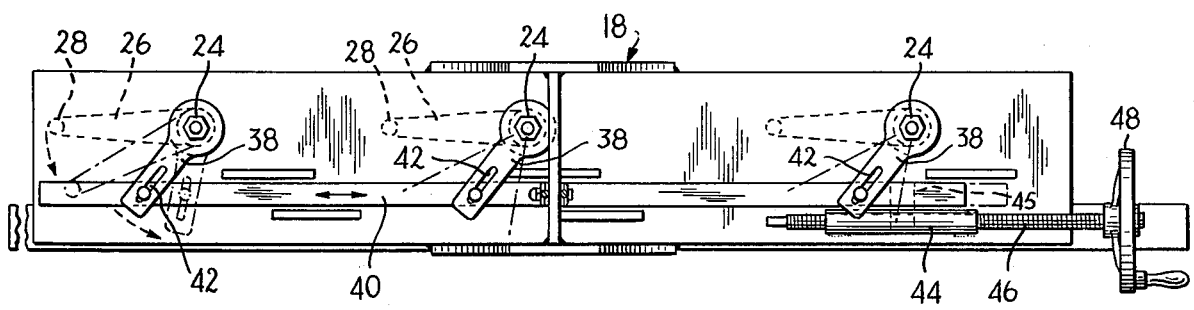
FIG. 2 is a top view of the lifter shown in FIG. 1 and taken along line 2—2 in FIG. 1.
Figure 3:
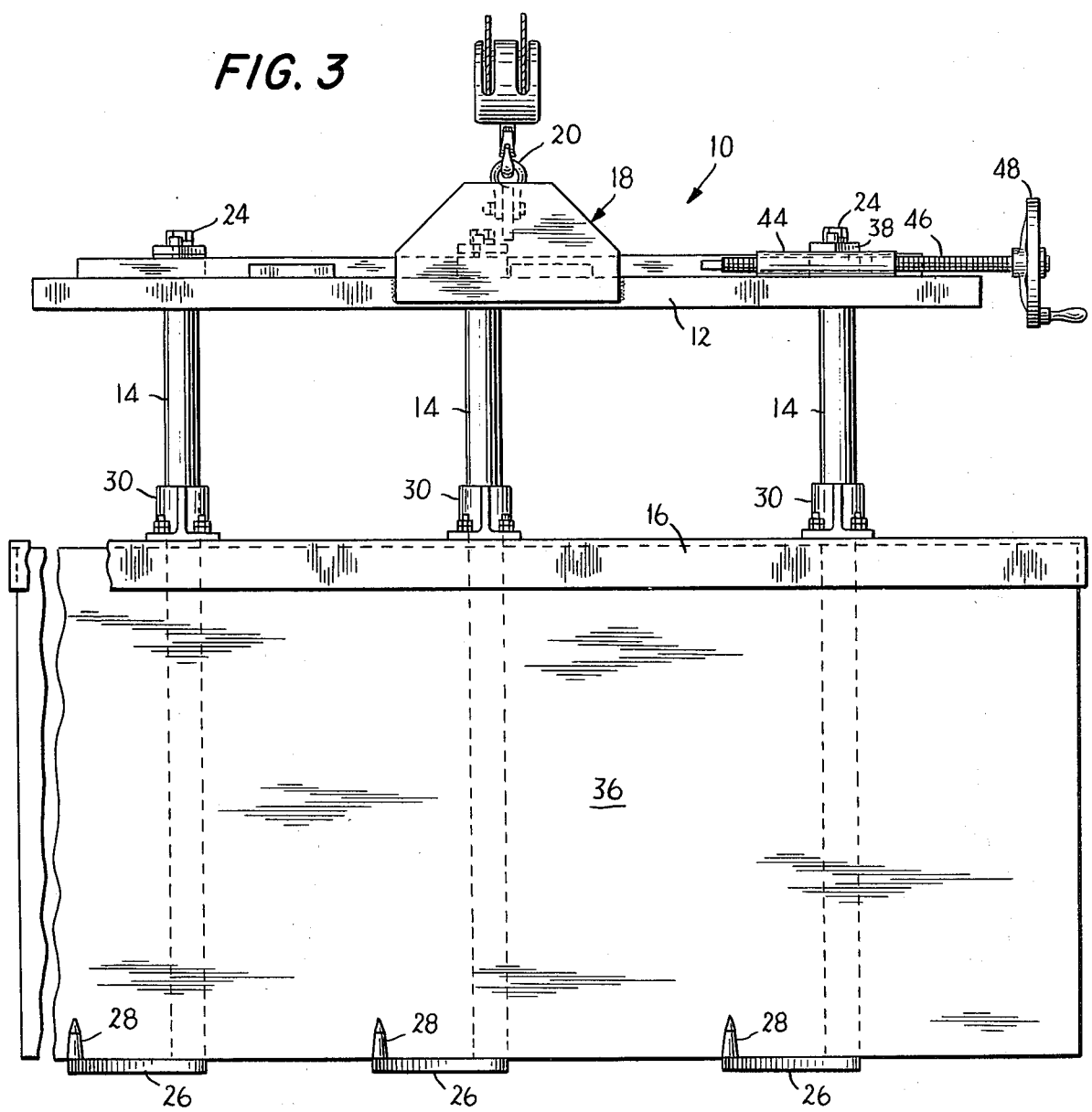
FIG. 3 is a front plan view of the lifter with one or more sheets being lifted.

As most clearly seen in FIG. 2, the rods 14 are mounted to the header unit through nuts 24. A crank lever 38 is secured to each end by the nuts 24. The crank levers 38 are in turn connected to a bar 40, through a lost motion connection 42. Bar 40 is linearly translatable along the length of header unit 12 as indicated by the double headed arrow in FIG. 2. Linear translation of the bar is achieved via threaded collar sleeve 44 which is fixed to the bar for internal movement therewith, such as by conventional strap 45 welded to both the bar 40 and sleeve 44. A worm 46 is mounted in the sleeve 44. Due to its connection with the bar 40, sleeve 44 will only translate when the worm is rotated by, for instance, handwheel 48. As can be readily appreciated, this will cause limited rotation of rods 14, and of plates 26 and pins 28, in a direction related to the direction of translatory movement of the bar 40.

The above feature can best be understood by referring to FIG. 4. In this figure, rods 14 have been rotated to bring plates 26 and pins 28 within the envelope of the rods 14 — the plates and pins are parallel to the plane containing the rods 14. This configuration represents the smallest profile obtainable and it permits the insertion of the unit into a rather narrow space. FIG. 4 shows a plurality of stacking units 50 carried on a rail 52. A stack of sheets 36 is supported by each stacking unit. As can be readily appreciated, the distance between a stack 36 and an adjacent stacking unit can be rather small. The present apparatus can neatly be made to fit within rather narrow spaces, as shown, by reorienting the position of the plates 26 and pins 28.

In FIG. 4, the lifting unit is shown being inserted between a stack of sheets and an adjacent stacking unit. The unit is moved downwardly, by the overhead crane to the position shown in dotted lines. During this downward movement, the angle bar 16 will contact the upper edge of the stack and be pushed upwardly to allow the continued downward movement of the lifting unit.

When the dotted line position has been reached, the hand wheel 48 is turned in a direction which retracts threaded collar 44 and bar 40, thereby rotating rods 14 along with plates 26 and pins 28 to the dotted line position shown in FIG. 4. The overhead crane is then activated to lift the unit. Upon lifting of the unit, the stack 36 will then rest securely in the U-shaped section defined by rod 14, plate 26 and pin 28, and may then be lifted out of the stacking unit 50 as shown in FIG. 5. Although not shown in the drawings, it is to be understood that the rotation of rods 14 may be limited so as to position the tapered ends of pins 28 to remove only a few sheets from the stack. In this embodiment, the tapered end of the pin gently separates the sheets to be removed from the remainder of the stack. Continued upward movement of the unit urges the wider portion of the pins between the sheets to achieve the desired separation without harming the sheets.

Normally, stacking units of the type depicted contain a plurality of rails to support the stack. The space between rods 14 is sufficient to clear these rails to allow the lifting unit to enter, engage, and lift the stack.

In order to maintain a degree of separation between the angle bar 16 and the lower end of the rods 14, a stop 54 may be provided on one or more of the rods 14. In addition, the angle bar may be lifted by hand instead of allowing it to contact the upper edge of the stack and moved upwardly as the lifting unit continues its downward movement as shown in FIG. 4.

Figure 6:
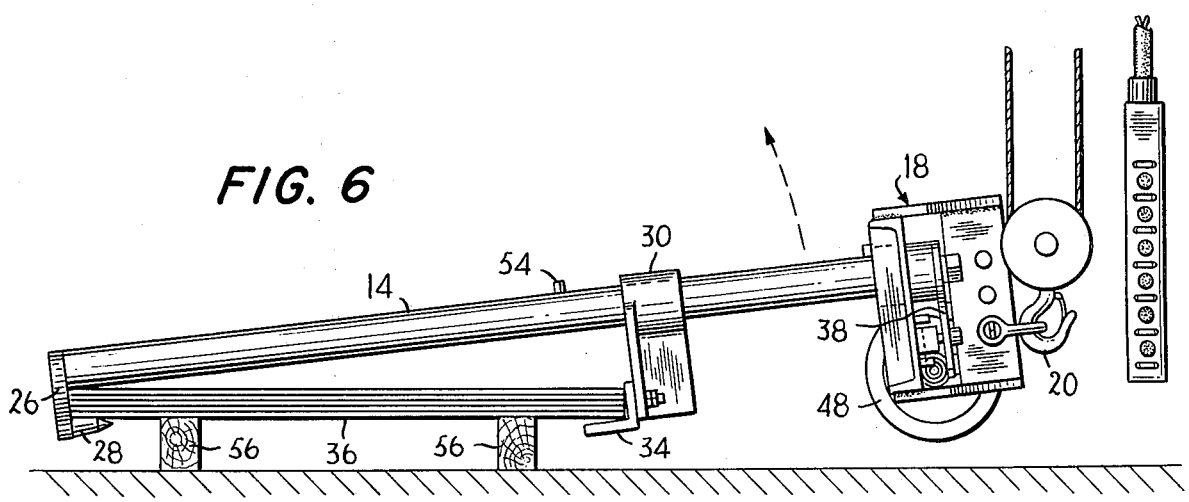
FIG. 6 is a side view of the lifter of FIG. 1 in the process of lifting a stack of sheets from the horizontal position.

Referring now to FIG. 6, there is depicted the use of the lifting unit to lift a stack lying in a horizontal position. Stacks are generally never left flat on a ground surface. They are generally stored and delivered, on support blocks indicated by numeral 56. To lift a stack from this position, the lifting unit is lowered to a nearly horizontal position. Preferably, the stack is first placed in the U-shaped section between pins 28 and rods 14. The angle bar 16 is then slid along the rods until the depending leg 34 of the angle bar clears the edge of the stack. The angle bar is then moved downwardly to engage the stack or allowed to move downwardly under the influence of gravity, after which the stack may be lifted and removed to another location.

FIGS. 7 and 8 depict another embodiment of the invention in which provision is made for automatically raising and lowering the angle bar 16.

To this end, a pair of threaded rods or worms 58 are conventionally rotatably mounted in header unit 12. The threaded shafts engage a threaded collar or sleeve 60 on the angle bar 16. The upper end of the threaded rod is capped by a gear 62, preferably of the bevel type.

A shaft 64 is rotatably mounted on the header unit, as by bearings 66 and 68. A pair of bevel gears 70 are mounted on the shaft 64 in meshing engagement with bevel gears 62. Upon rotating of shaft 64, motion will be transmitted through bevel gears 70 to bevel gears 62, thus rotating threaded shafts 58 to raise or lower angle bar 16.

As shown in FIGS. 7 and 8, the hand wheel 48 is connected to shaft 72 which shaft carries a gear 74 thereon. The shaft 72 is positioned between shaft 64 and bar 40, and is adapted to be linearly translated in bearings 68 and 76. Worm 46 is provided with another gear 78. These gears are spaced from each other along the direction of translation of shaft 72, as shown in the drawings.

In the position of the shaft 72 shown in the drawings, bar 40 cannot be translated nor can shaft 64 be rotated. Upon inward translation of shaft 72, gear 74 will engage gear 80. Rotation of the handwheel 48 will then serve to impart rotation of shaft 64 to raise and lower angle bar 16. Upon outward translation of shaft 72, gear 74 will engage gear 78. Upon rotation of handwheel 48 with the shaft in this position, bar 40 will be translated to rotate rods 14.

As shown in FIGS. 7 and 8, the threaded collar or sleeve which is connected to bar 40 is of slightly different configuration and is here denoted by the numeral 82. The collar 82 is connected to the bar by a single tongue and groove connection as indicated at 84 in FIG. 8. However, any type of connection can be used which will link the collar and bar together for joint movement.

Many modifications in and to the above-described embodiments will occur to those skilled in the art. It is intended to cover all such modifications which fall within the spirit and scope of the invention as defined in the claims appended hereto.

What is claimed is:

1. Sheet material handling apparatus comprising: a header unit, a plurality of rods mounted for rotation in said header unit, means on each of said rods for engaging said sheet material at one end thereof, said means comprising a U-shaped member for gripping the end of the sheet material to be handled and other means slidably mounted on said rods for engaging the other end of said sheet material.

2. The apparatus according to claim 1 wherein each of said U-shaped members comprises a plurality of plates, each plate being eccentrically mounted to a rod and extending laterally therefrom, a pin mounted on each said plate and spaced from the rod, said pins extending substantially parallel to said rods such that the pins and rods will engage opposite sides of the sheet material, said rods being rotatable to move the pins against the sheet material to be handled.

3. The apparatus according to claim 2 wherein said other means comprises an angle bar, a plurality of first bearings mounted on one leg of said angle bar for slidably receiving said rods, the angle bar being adapted to engage the sheet material at one end thereof opposite to the end engaged by said pins.

4. The apparatus according to claim 2 wherein said pins are tapered in a direction extending away from said plates.

5. The apparatus according to claim 1 wherein said header unit comprises a bar, a plurality of second bearings, one for each rod, fixedly mounted on said header unit and spaced a selected distance from said bar, an internally threaded sleeve fixedly mounted to said bar, a worm mounted to said header unit and rotatable in said sleeve, and means connecting said sleeve to said bar, said sleeve and bar being linearly translatable upon rotation of said worm, said second bearings being rotated upon translatory movement of said bar to rotate said U-shaped member.

6. The apparatus according to claim 1 wherein said header unit comprises means for receiving the hook of an overhead crane.

7. The apparatus according to claim 1 further comprising means for moving said other means along said rods.

8. The apparatus according to claim 7 wherein said means for moving said angle bar comprises at least one internally threaded sleeve mounted on said angle bar, at least one worm rotatably received in said at least one sleeve and rotatably mounted on said header, and means for imparting rotation to said second worm to raise and lower said angle bar.

9. The apparatus according to claim 8 wherein said means for imparting rotation to said worm comprises a first gear mounted on said worm, a rotatable shaft mounted on said header unit, said rotatable shaft having a second gear thereon for mating with said first gear, and means for rotating said shaft to impart rotation to said second gear and shaft.

10. Sheet material handling apparatus comprising: at least one rod rotatably mounted on a header unit; said at least one rod having a plate secured thereto at a point removed from said header unit; a pin secured to said plate, said plate and pin forming a receiving channel for receiving one end of said sheet material, said pins being moveable to a position in which the pins and the rods engage the sheet material on opposite sides thereof upon rotation of said at least one rod, and means on said header unit for rotating said rod; an angle plate slidably mounted on said at least one rod and having a depending leg adapted to engage the sheet material on the side engaged by said pins, said angle plate being moveable into and out of engagement with said sheet material to permit said sheet material to be lifted and deposited in a selected location.

11. The apparatus according to claim 10 comprising means for rotating said at least one rod, said means comprising a threaded sleeve and a bar, said sleeve being fixedly connected to said bar, a first worm mounted in said sleeve, said sleeve and bar being linearly translatable upon rotation of said first worm; and means connected to said bar for rotating said at least one rod upon linear translation of said sleeve and bar.

12. The apparatus according to claim 11 further comprising means for sliding said angle plate on said at least one rod, said means for sliding said angle plate comprising at least one threaded bar rotatably mounted on said heater unit and to said angle plate for receiving said threaded bar and for causing said angle plate to move on said at least one rod in direction determined by the direction of rotation of said threaded bar; and means on said header unit for rotating said at least one threaded bar.

13. The apparatus according to claim 12 wherein said means for rotating said at least one threaded bar comprises a first shaft mounted on said header unit, said first shaft having at least one first gear thereon, a second gear on said at least one threaded bar adapted to mesh with said first gear, and means on said header unit for imparting rotation to said first shaft.

14. The apparatus according to claim 13 wherein said means for imparting rotation to said first shaft comprises a second rotatable first shaft having a third gear thereon, a fourth gear on said first shaft adapted to mesh with said third gear and to rotate said first shaft upon rotation of said second shaft.

15. The apparatus according to claim 14 wherein said first shaft and said bar are spaced from each other and wherein said second rotatable shaft is mounted between said first shaft and said bar, said first worm having a fifth gear thereon longitudinally spaced from the gear on said first shaft, said second rotatable shaft being displaceable to selectively engage said fourth gear and said fifth gear to selectively raise and lower said angle plate, and rotate said at least one rod.

16. The apparatus according to claim 15 wherein there are three rods depending from said header unit and two threaded bars for raising and lowering said angle plate.

* * * * *